US006688894B2

(12) United States Patent
Knox, Jr. et al.

(10) Patent No.: US 6,688,894 B2
(45) Date of Patent: Feb. 10, 2004

(54) UMBILICAL CABLE ASSEMBLY

(75) Inventors: William H. Knox, Jr., Wauchula, FL (US); William E. Calligan, Jr., Palm Harbor, FL (US)

(73) Assignee: Caltek Corporation, St. Petersburg, FL (US)

( * ) Notice: Subject to any disclaimer, the term of this patent is extended or adjusted under 35 U.S.C. 154(b) by 0 days.

(21) Appl. No.: 10/313,046

(22) Filed: Dec. 6, 2002

(65) Prior Publication Data

US 2003/0119355 A1 Jun. 26, 2003

Related U.S. Application Data

(60) Provisional application No. 60/342,286, filed on Dec. 21, 2001.

(51) Int. Cl.[7] .............................................. H01R 11/00
(52) U.S. Cl. ..................................... 439/76.1; 439/502
(58) Field of Search ............................... 439/76.1, 686, 439/687, 694, 695, 696, 502, 466, 468

(56) References Cited

U.S. PATENT DOCUMENTS

| | | | | | |
|---|---|---|---|---|---|
| 5,192,226 A | * | 3/1993 | Wang | .......................... | 439/502 |
| 5,295,859 A | * | 3/1994 | Kawai et al. | ................ | 439/466 |
| 5,667,401 A | * | 9/1997 | Kuwabara et al. | .......... | 439/502 |
| 5,982,624 A | * | 11/1999 | Onoda et al. | .............. | 439/76.1 |
| 6,319,066 B2 | * | 11/2001 | Kuo | .......................... | 439/76.1 |
| 6,375,477 B2 | * | 4/2002 | Nishikawa et al. | ......... | 439/76.1 |
| 6,386,917 B1 | * | 5/2002 | Sakaguchi | .................. | 439/502 |

\* cited by examiner

Primary Examiner—Gary Paumen
(74) Attorney, Agent, or Firm—Dennis G. LaPointe; Mason Law, PA

(57) ABSTRACT

The specification and drawings describe and show one embodiment of the present invention in the form of an umbilical cable connector, including a multi-pin plug connector at one end of a multi-wire insulated cable and a multi-socket connector at the other end. The invention can be used for remote control of various electronic and electrical components using programmable controllers. It is emphasized that this abstract is provided to comply with the rules requiring an abstract that will allow a searcher or other reader to quickly ascertain the subject matter of the technical disclosure.

3 Claims, 4 Drawing Sheets

UMBILICAL CABLE ASSEMBLY

RELATED APPLICATION

This application claims the benefit of related provisional application U.S. Ser. No. 60/342,286, filed Dec. 21, 2001.

FIELD OF THE INVENTION

This application relates to an umbilical cable assembly and its novel interface pin connectors for low voltage systems, typically less than 600 volts and generally in the 250 volt range. However, the invention could be used for even lower voltage rated components.

As an example, the cable assembly can be used as a remote mount connector where a remote control device, such as a keypad base, can be moved from a base station part of a component to a remote location for end user remote control and monitoring. In one application, a remote keypad base option is available in a programmable motor overload protector relay by designing the relay component so that the keypad base can be removed and located to a remote site. The keypad base is interconnected with the umbilical cable assembly, wherein one end of the cable connects to the keypad base and the other end of the cable connects to the component. This allows remote monitoring of desired parameters and remote control to input data or program changes to the motor overload protector relay.

The remote connector was designed to be used in an environment where high voltage wiring feeds are present, certain safety features of the cable connector ends were specifically designed to provide protection for both the components being interconnected by the cable assembly and the end user.

Specific safety features built into the connector housing are: a wide enough cable restraint area capable of accommodating a cable with 600 volt or less safety insulation; and recessed male and female pins and sockets for finger safe use. The cable assembly is fabricated in such a fashion that with the cable removed at either or both ends, the cable, and also preferably the component connector, have no exposed metal contacts or live parts.

Other specific functional features are: a unique keying arrangement that precludes incorrect installation of the entire cable assembly or misalignment of the connector to the proper housing end. This feature also provides protection of the connecting surfaces such that the pins or sockets cannot be malformed.

Figure 1:
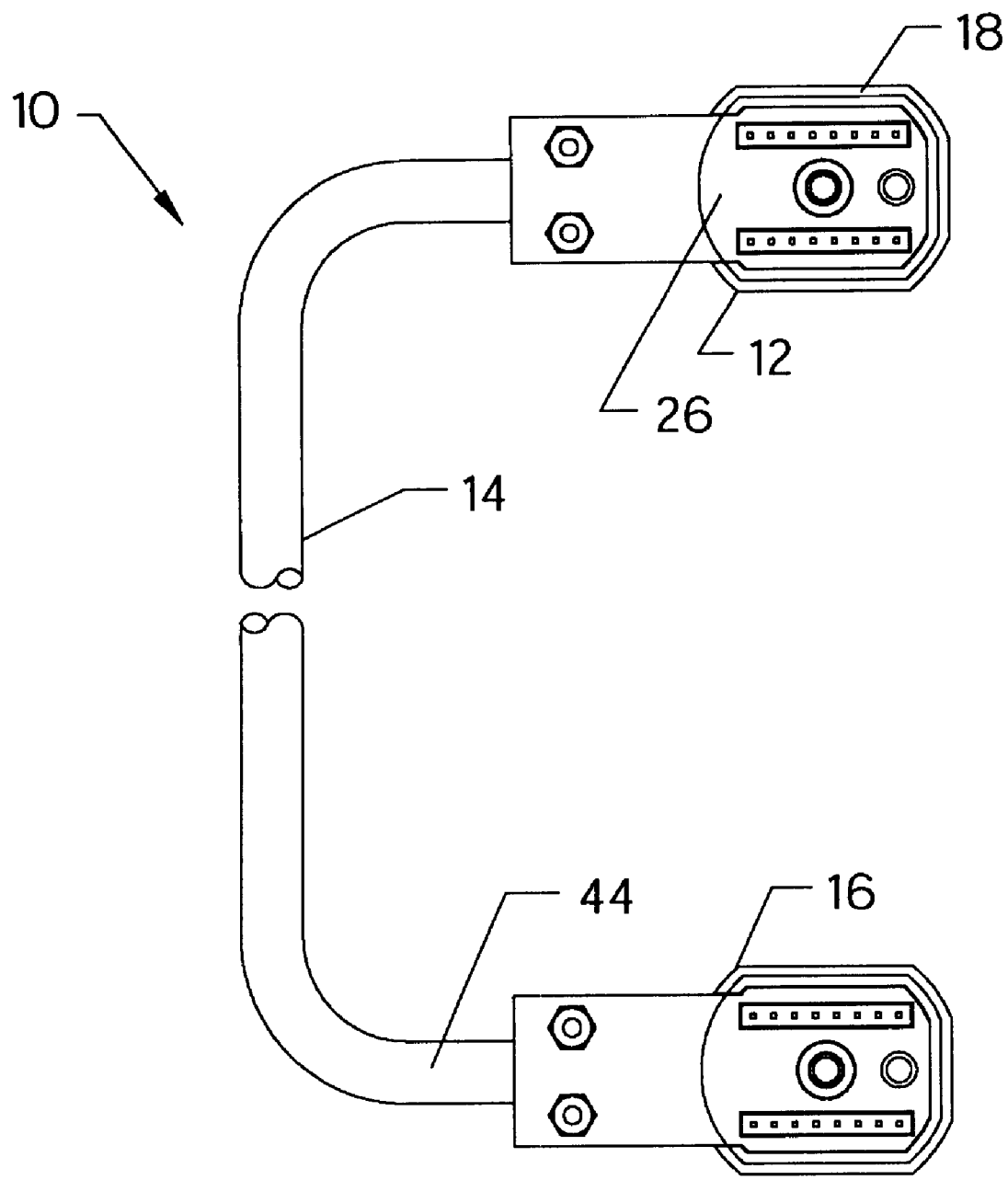
FIG. 1 is a schematic depiction of an example embodiment of the present invention.
Figure 2:
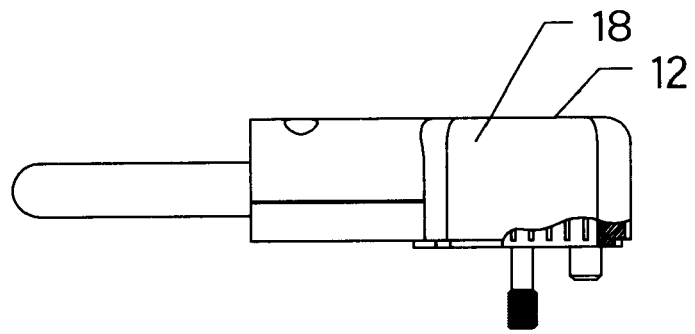
FIG. 2 is a side view of the male pin connector side of the invention depicted in FIG. 1.

Referring now to the drawings, FIGS. 1–6a and 6b disclose one embodiment of the present invention, which is an umbilical cable assembly, depicted generally as 10.

The cable assembly 10 includes a male multi-pin plug connector 12 electrically connected to a multi-wire cable 14 at one end of said cable and a multi-socket connector 16 electrically connected to an opposite end of said multi-wire cable 14.

The male multi-pin plug connector 12 includes a housing with an open side 20. The housing 18 has a depth sufficient for holding a circuit board 22. The circuit board 22 is a printed circuit board with at least one row of a plurality of parallel oriented pins 24 directed toward the open side. Each row of the plurality of parallel oriented pins 24 define a male stacking header. The multi-pin plug connector further includes a mating housing cover 26 which couples with the housing 18 holding the circuit board 22 on the open side 20 of the housing 18 holding the circuit board 22 to complete the encapsulation of the circuit board 22.

The mating housing cover 26 has an opening 28 aligned with the at least one row of the plurality of pins 24 such that when the mating housing cover 26 and the housing 18 containing the circuit board 22 are coupled, the male stacking header is visible through the at least one opening 28. Opening 28 is further sized to receive a component's corresponding multi-pin socket connector, and the free ends of the pins 24 in the male stacking header are further recessed from an exposed surface 30 of the mating housing cover 26 to prevent contact by a user with the free ends of the pins 24, as shown in the break away view of FIG. 2.

Figure 6A:
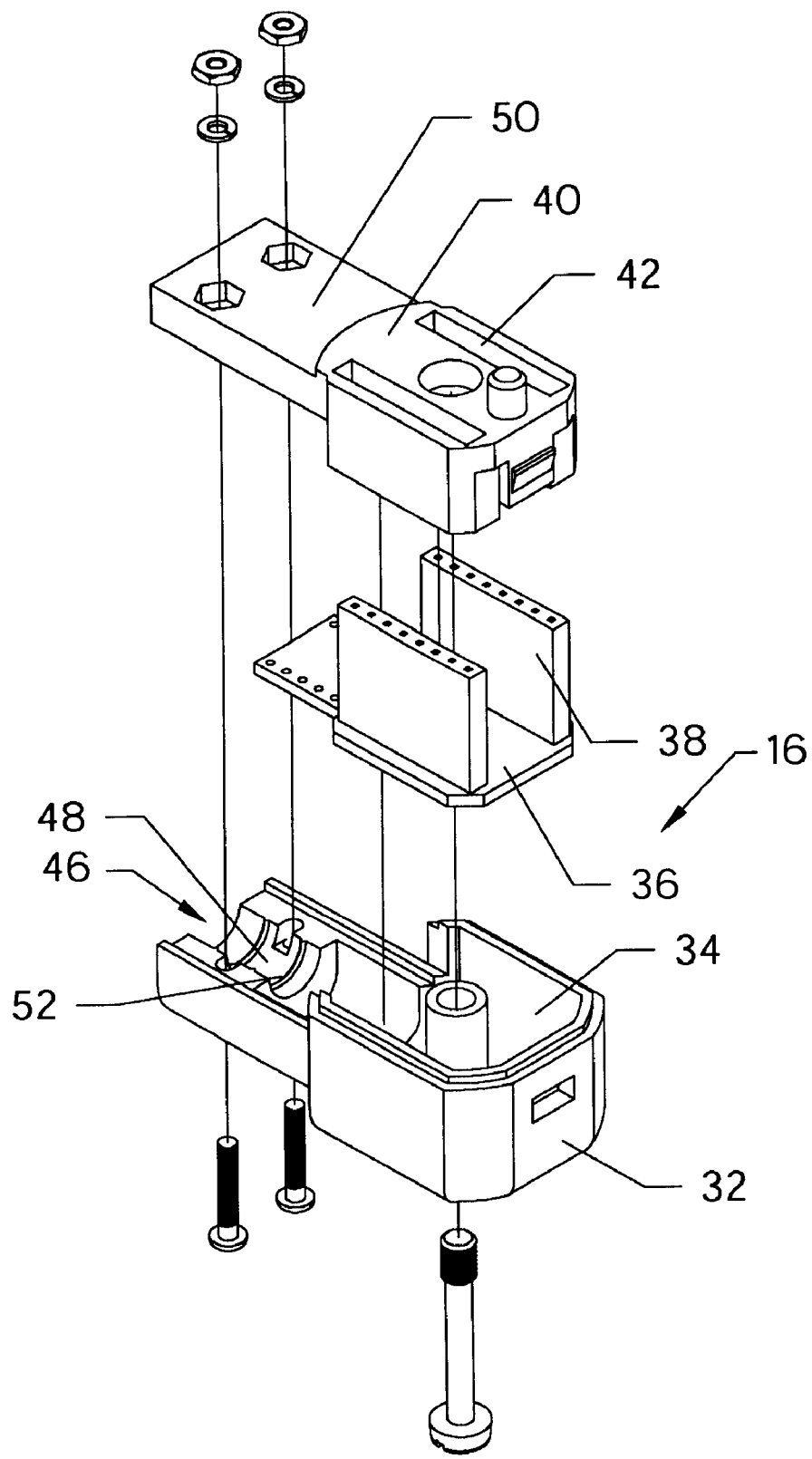
FIG. 6a is an exploded component assembly depiction of the socket connector depicted in FIGS. 3 and 4.
Figure 6B:
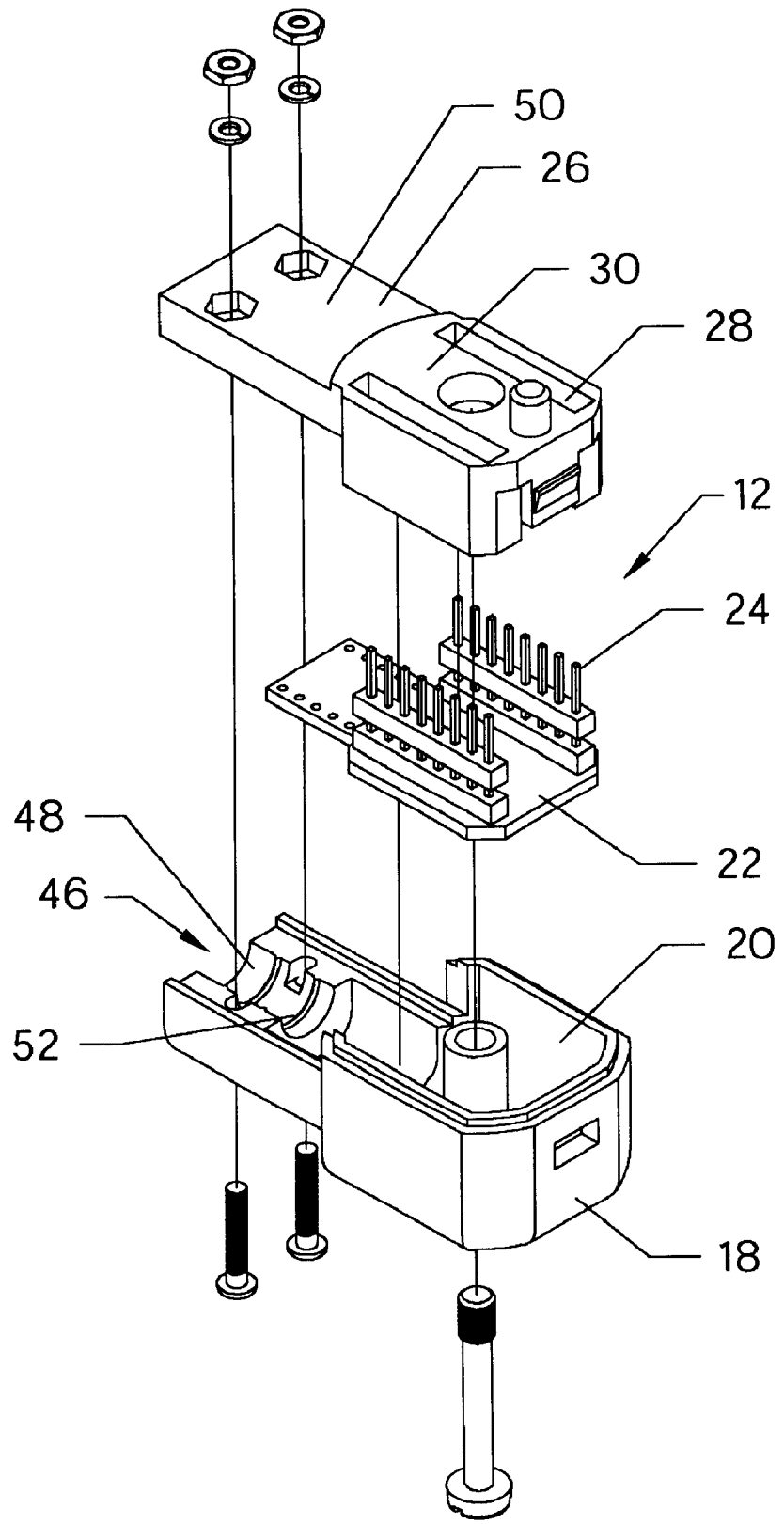
FIG. 6b is an exploded component assembly depiction of the pin connector depicted in FIGS. 2 and 5.

As shown in FIG. 6B, the assembly of the connector 12 is rather simple in that the circuit board 22 is inserted and retained within the housing 18 with the pins 24 directed toward the open side 20. In this case, two rows of eight pins are depicted, although the pin array chosen is a matter of design choice and is contemplated to be within the scope of this invention. The housing cover 26 is located to encapsulate the connector 12 and held by a threaded fastener through the approximate center of the connector 12.

The multi-socket connector 16 includes a housing 32 with an open side 34. Housing 32 has a depth sufficient for holding a circuit board 36, which includes at least one row of a plurality of parallel oriented sockets 38 directed from the circuit board 36 toward the open side 34. Each row of the plurality of parallel oriented sockets 38 define a female stacking socket. Multi-socket connector 16 also includes a mating housing cover 40, which couples with the housing 32 holding the circuit board 36 on the open side 34 of the housing 32 holding the circuit board 36 therein completing the encapsulation of the circuit board 36.

Figure 3:
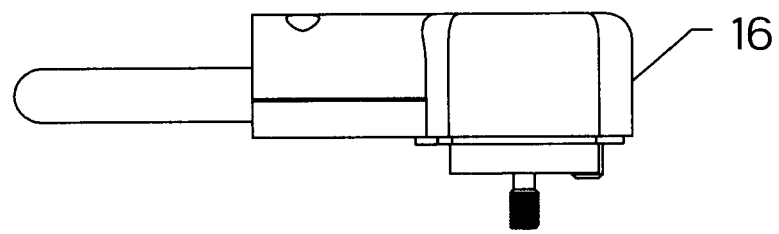
FIG. 3 is a side view of the female socket connector of the invention depicted in FIG. 1.
Figure 4:
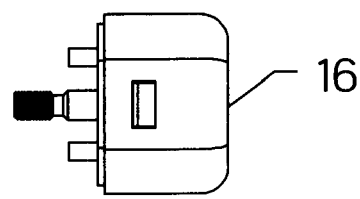
FIG. 4 is an end view of the socket connector depicted in FIG. 3.
Figure 5:
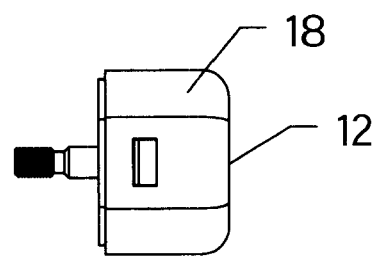
FIG. 5 is an end view of the pin connector depicted in FIG. 2.

The mating housing cover 40 has an opening 42 aligned with the at least one row of the plurality of parallel oriented sockets 38 such that when the mating housing cover 40 and the housing 32 containing the circuit board 36 are coupled, the female stacking socket extends through the at least one opening 42 as depicted in FIGS. 3 and 4. The multi-socket connector 16 is formed to mate with another component's corresponding multi-pin plug connector.

As shown in FIG. 6A, the assembly of the connector 16 is rather simple in that the circuit board 36 is inserted and retained within the housing 32 with the sockets 38 directed toward the open side 34. In this case, two rows of eight sockets are depicted, although the socket array chosen is a matter of design choice and any variant thereof is contemplated to be within the scope of this invention. The housing cover 40 is located to encapsulate the connector 16 and held by a threaded fastener through the approximate center of the connector 16.

Connector housings 18, 32 are each formed in a generally U-shaped channel, within which the cable 14 with its insulation cover 44, is fed into each connector 12, 16. This channel is in effect a wire-way means 46 for sleeving the cable 14 into each connector 12, 16 and for securing the cable 14 to each connector 12, 16. As mentioned, the wire-way means 46 includes a channel portion 48 through which the cable 14 can be sleeved through and into the housing 18, 32 for electrically connecting the cable wires to the respective circuit board 22, 36. The housing cover 26, 40 further has an extended portion 50 that covers said channel portion 48 and secures the cable 14 passing through the channel portion 48.

As shown in FIGS. 6A and 6B, the cable 14 is further secured in the wire-way means 46 by passing two screws through the connector and fastening and tightening the wire feed with washers and nuts or with locking nuts.

As shown in FIGS. 6A and 6B, the channel portion 48 may further include at least one raised portion 52 on an inner surface of the channel portion 48, the raised portion 52 for facilitating gripping of an insulation cover 44 for the cable 14 passing through said channel portion 48 when said housing cover 26, 40 is secured to the housing 18, 32. As shown, the raised portion 52 can be in the form of one or more ridge projections (continuous or discontinuous in nature) around the inside circumference of the channel portion 48.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

Now that the invention has been described,
What is claimed is:

1. An umbilical cable assembly comprising:
   a male multi-pin plug connector electrically connected to a multi-wire cable at one end of said cable and a multi-socket connector electrically connected to an opposite end of said multi-wire cable;
   the male multi-pin plug connector including a housing with an open side, the housing holding a circuit board, the circuit board including at least one row of a plurality of parallel oriented pins directed toward the open side, each row of the plurality of parallel oriented pins defining a male stacking header, and a mating housing cover which couples with the housing to encapsulate said circuit board;
   the mating housing cover having an opening aligned with the at least one row of the plurality of pins such that when the mating housing cover and the housing containing the circuit board are coupled, the male stacking header is visible through the at least one opening, the at least one opening further being sized to receive a component's corresponding multi-pin socket connector, and the free ends of the pins in the male stacking header further being recessed from an exposed surface of the mating housing cover to prevent contact by a user with the free ends of the pins;
   the multi-socket connector including a housing with an open side, the housing holding a circuit board, the circuit board including at least one row of a plurality of parallel oriented sockets directed from the circuit board toward the open side, each row of the plurality of parallel oriented sockets defining a female stacking socket, and a mating housing cover which couples with the housing to encapsulate said circuit board; and
   the mating housing cover having an opening aligned with the at least one row of the plurality of parallel oriented sockets such that when the mating housing cover and the housing containing the circuit board are coupled, the female stacking socket extends through the at least one opening, the multi-socket connector being formed to mate with another component's corresponding multi-pin plug connector.

2. The cable assembly according to claim 1, wherein the multi-pin plug connector housing and the multi-socket connector housing, each further comprise wire-way means for sleeving the cable into each connector and for securing the cable to each connector, the wire-way means including a channel portion through which the cable can be sleeved through and into the housing for electrically connecting the cable wires to the circuit board and the housing cover further having an extended portion that covers said channel portion and secures the cable passing through said channel portion.

3. The cable assembly according to claim 2, wherein the channel portion further includes at least one raised portion on an inner surface of the channel portion, the raised portion for facilitating gripping of an insulation cover for the cable passing through said channel portion when said housing cover is secured to the housing.

\* \* \* \* \*